(No Model.)
J. HOLBROOK.
MACHINE FOR ORNAMENTING GLASS.
No. 555,164. Patented Feb. 25, 1896.
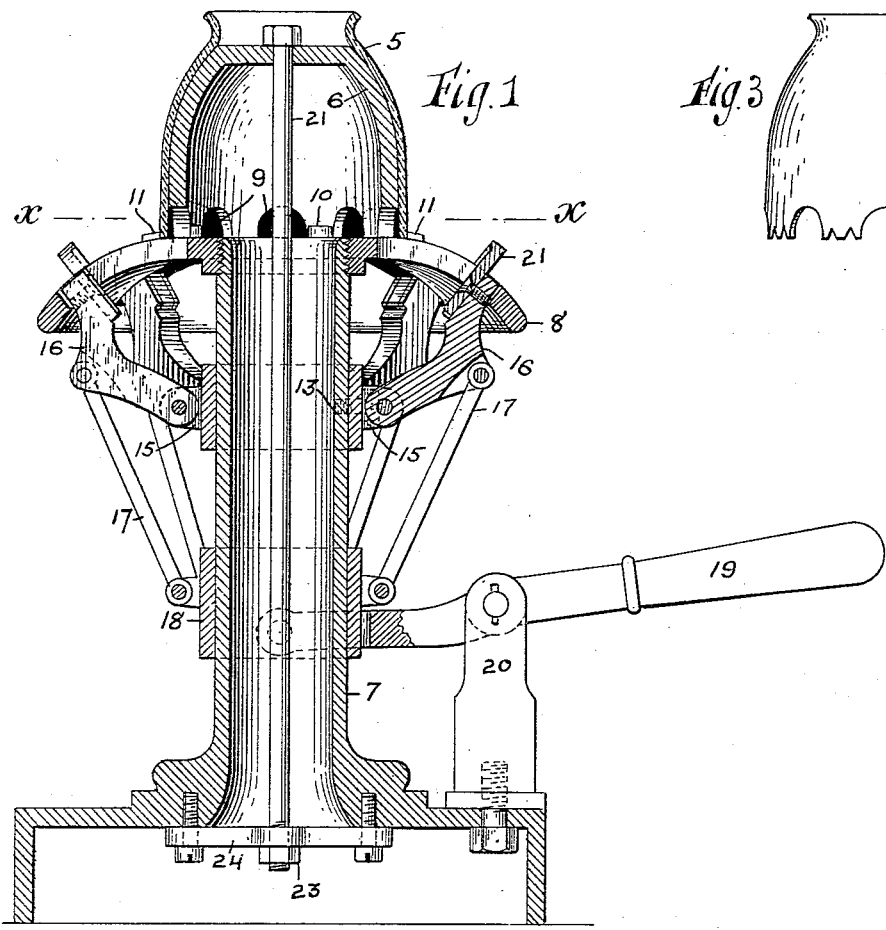
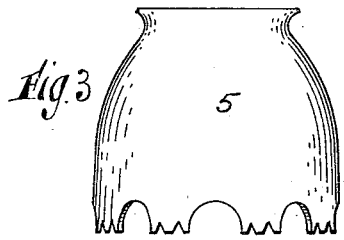
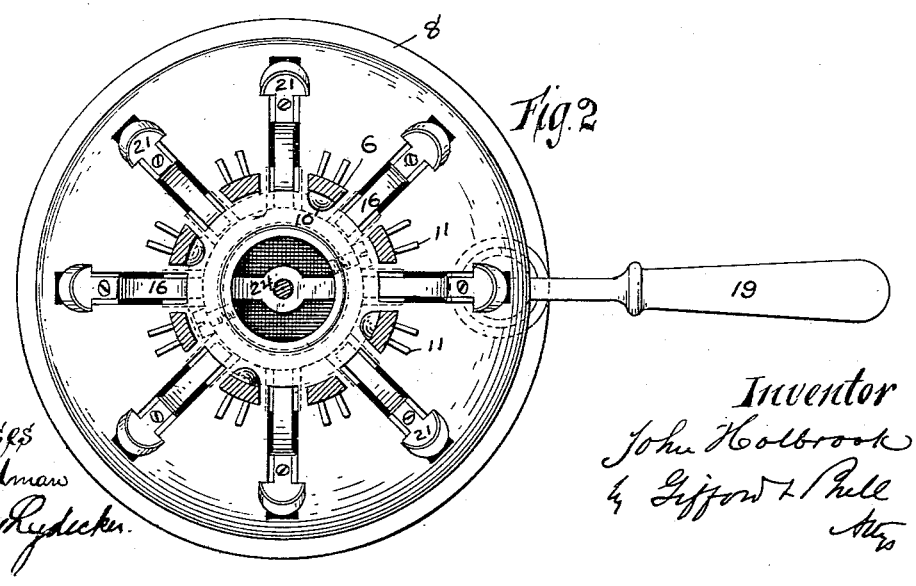
Witnesses
Geo Wadman
Harry Rydecker
Inventor
John Holbrook
by Gifford & Bull
Attys

UNITED STATES PATENT OFFICE.

JOHN HOLBROOK, OF BROOKLYN, NEW YORK.

MACHINE FOR ORNAMENTING GLASS.

SPECIFICATION forming part of Letters Patent No. 555,164, dated February 25, 1896.

Application filed March 18, 1895. Serial No. 542,128. (No model.)

*To all whom it may concern:*

Be it known that I, JOHN HOLBROOK, a subject of the Queen of Great Britain, and a resident of Brooklyn, in the county of Kings and State of New York, have invented certain new and useful Improvements in Machines for Ornamenting Glass, of which the following is a specification.

My invention relates to machines for cutting, crimping or otherwise ornamenting glassware; and it consists in certain novel parts and combination of parts; and also of certain novel methods, all particularly pointed out in the claim concluding this specification.

In the accompanying drawings I have shown my invention embodied in the form which is at present preferred by me when applied to the cutting and crimping of glass shades; but it will be understood that the invention is applicable to other analogous uses and that various modifications and changes in the apparatus may be made without departing from the spirit of my invention and without exceeding the scope of my claim.

In the accompanying drawings, Figure 1 is a vertical section through the machine. Fig. 2 is a top view thereof and a section on the line $x\,x$, Fig. 1; and Fig. 3 is an elevation of the shade after it has been fashioned by the machine.

I will now describe the particular illustration of my invention which is shown in the accompanying drawings.

5 is a glass shade such as is commonly employed on electroliers, and which it is desired to ornament by crimping and (under the old method) cutting.

6 is a form corresponding more or less closely to the interior contour of the shade and on which the shade is placed and held while being ornamented.

7 is a standard preferably made hollow, as shown, the upper end of which is screw-threaded and to which the screw-threaded flange 8 is attached. These parts, obviously, might be attached by bolts or any other suitable means.

The form 6 rests on top of the flange 8 and is provided with a series of perforations 9 9. This form is centered by means of lugs 10, two of which are shown in Fig. 1. On the upper side of the flange 8 are arranged a series of crimping projections 11 11. The hollow tube 7 is provided with a collar 12 fixed to said tube by means of a set-screw 13. This collar carries a series of projections or ears 15, to which bell-crank levers 16 16 are pivoted, operated by rods 17 17, the lower ends of which are pivoted on the collar 18, which is free to slide longitudinally on the tube, and are actuated by a lever 19, pivoted on a stud 20, and attached to the collar by pinions or otherwise. The bell-crank levers 16 carry knives or shears or punches 21 removably attached thereto, the faces of which may be either flat or, as shown in the drawings, may be provided with raised and sharpened edges. These knives project through radial slots cut in the flange 8 and are all simultaneously operated by the vibration of the collar 18. The form 7 is held in place by a rod 22 passing through the tube 7 and attached by a nut 23 to a cross-bar 24.

The operation of the device may be thus described: A shade 5 is placed over the form 6 while it is still in a semi-molten or semi-soft condition. By its weight or by pressure exerted at the time the crimping-ribs 11 form on the lower edge of the shade, where it comes in contact with them, suitable indentations. The lever 19 is then actuated, elevating the collar 18 and causing the knives 21 to punch out from the edges of the shade semicircular pieces of glass, which fall through the hollow tube 7 to the table on which the machine rests. Thus by a single operation the shade may be ornamented both by crimps and in scallops, avoiding the necessity of subsequently cutting the glass by tools, as is now done in such cases.

Of course it will be understood that the ornamentation may consist merely of shearing or removing parts of the shade and that various kinds of ornamentation may be done by means of a machine constructed in substance as that hereinbefore described. The machine is especially designed and constructed so as to permit the acting parts to be removed and replaced by others of different design to accomplish different styles of ornamentation or to ornament shades of various sizes or shapes. Thus by unscrewing the nut 23 the form 26 may be taken off. Likewise the flange 8 and the knives may be readily removed to be replaced by others.

In the foregoing specification I have referred to a few of the modifications which may be employed in the practice of my invention; but I wish it to be understood that mention by me of a few modifications is not intended to exclude others not referred to and which are within the spirit and scope of my invention.

In the concluding claim the omission of an element above described or the omission of reference to the particular features of the elements mentioned is intended to be a formal declaration of the fact that the omitted elements or features are not essential to the inventions therein severally covered, and as to the method claims these are not limited to the mechanism employed in carrying them into effect.

What I claim is—

In a machine for ornamenting glass, the combination of a form on which the article to be ornamented rests and a laterally-projecting base on which the edge of said article rests, said form having a perforation corresponding to the part to be removed and said base having crimping projections on its upper surface, a punch and operating mechanism, whereby the article is both crimped and scalloped in a single operation.

JOHN HOLBROOK.

Witnesses:
HARRY LYDECKER,
M. WILSON.